(12) United States Patent  (10) Patent No.: US 7,549,057 B2
Sciupac  (45) Date of Patent: *Jun. 16, 2009

(54) SECURE TRANSACTIONS WITH PASSIVE STORAGE MEDIA

(75) Inventor: Louis H. Sciupac, Santa Clara, CA (US)

(73) Assignee: LaserCard Corporation, Mountain View, CA (US)

( * ) Notice: Subject to any disclaimer, the term of this patent is extended or adjusted under 35 U.S.C. 154(b) by 585 days.

This patent is subject to a terminal disclaimer.

(21) Appl. No.: 11/052,481

(22) Filed: Feb. 4, 2005

(65) Prior Publication Data

US 2005/0160277 A1 Jul. 21, 2005

Related U.S. Application Data

(63) Continuation of application No. 09/611,350, filed on Jul. 6, 2000, now Pat. No. 6,871,278.

(51) Int. Cl.
H04L 9/00 (2006.01)

(52) U.S. Cl. ...................................... 713/189; 713/185

(58) Field of Classification Search ................. 713/189, 713/185
See application file for complete search history.

(56) References Cited

U.S. PATENT DOCUMENTS

| | | | |
|---|---|---|---|
| 4,025,760 A | 5/1977 | Trenhamp | 235/61.7 B |
| 4,186,871 A | 2/1980 | Anderson et al. | 235/380 |
| 4,961,142 A | 10/1990 | Elliott et al. | 364/408 |
| 5,191,193 A | 3/1993 | Le Roux | 235/379 |
| 5,502,765 A | 3/1996 | Ishiguro et al. | 380/24 |
| 5,513,261 A | 4/1996 | Maher | 380/23 |
| 5,613,001 A | 3/1997 | Bakhoum | 380/4 |
| 5,651,064 A | 7/1997 | Newell | 380/4 |
| 5,694,471 A | 12/1997 | Chen et al. | 380/25 |
| 5,721,781 A | 2/1998 | Deo et al. | 380/25 |
| 5,745,604 A | 4/1998 | Rhoads | 382/232 |
| 5,790,662 A | 8/1998 | Valerij et al. | 380/2 |
| 5,878,141 A | 3/1999 | Daly et al. | 380/25 |
| 5,910,989 A | 6/1999 | Naccache | 380/25 |
| 5,999,626 A | 12/1999 | Mullin et al. | 380/25 |
| 6,005,945 A | 12/1999 | Whitehouse | 380/51 |

FOREIGN PATENT DOCUMENTS

GB 2333878 8/1999

*Primary Examiner*—Jacob Lipman
(74) *Attorney, Agent, or Firm*—Schneck & Schneck; Thomas Schneck

(57) ABSTRACT

A transaction system for use with passive data storage media, such as optical memory cards, uses secure protocols involving digital certificates for communication between a read/write drive and the medium and also for communication between the drive and a host computer. The drive stores crytographic keys and firmware for executing the secure protocols. All messages (data or commands) passed between the drive and the passive medium or host computer not only are encrypted but also include at least one digital certificate for authenticating the message. Typically, asymmetric (public-private key) encryption is used and keys may be derived from an authorized user's password, personal identification number, or biometric data. The drive includes sensors to detect any attempted intrusions and a control unit that will destroy the critical information (keys and protocol code) in response to a detected intrusion. The keys and protocols stored in a drive can themselves be changed through appropriate use of a secure protocol involving digital certificates.

16 Claims, 3 Drawing Sheets

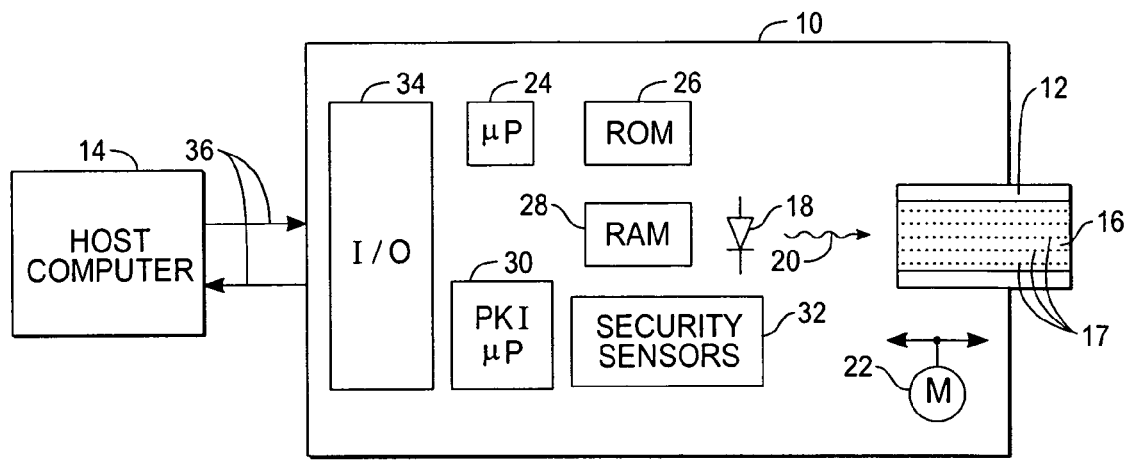
Fig._1
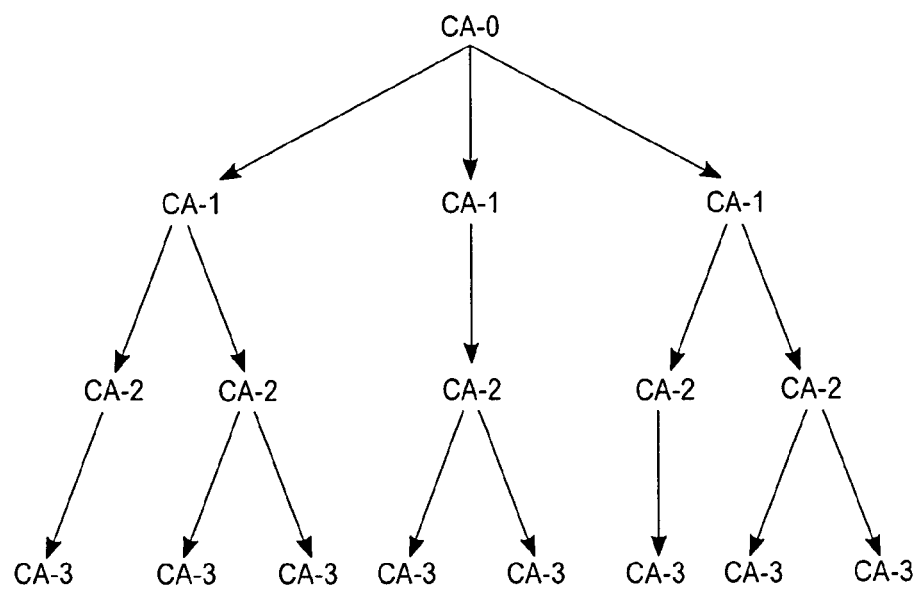
Fig._2

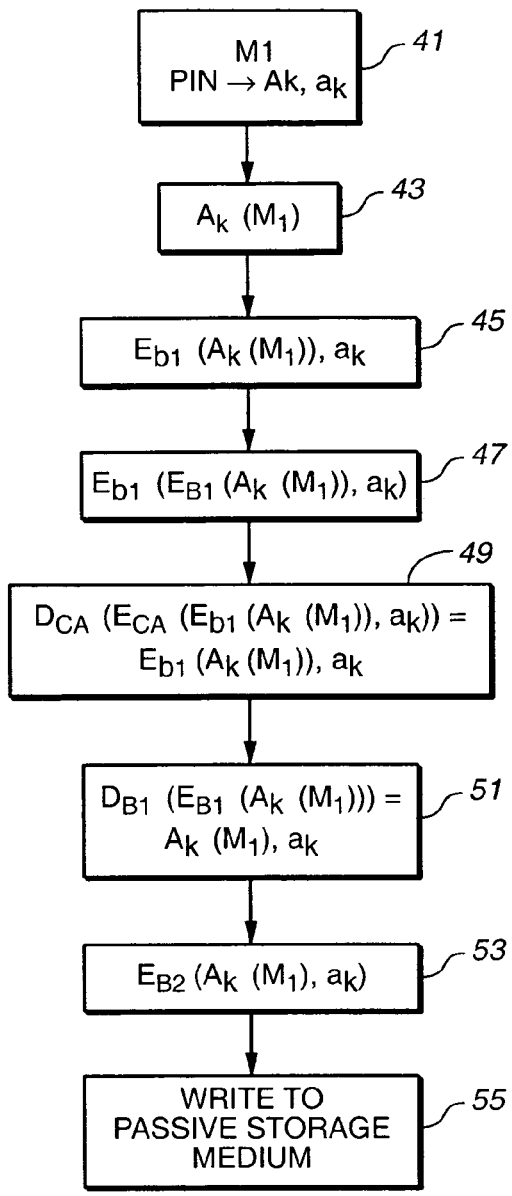
FIG._3
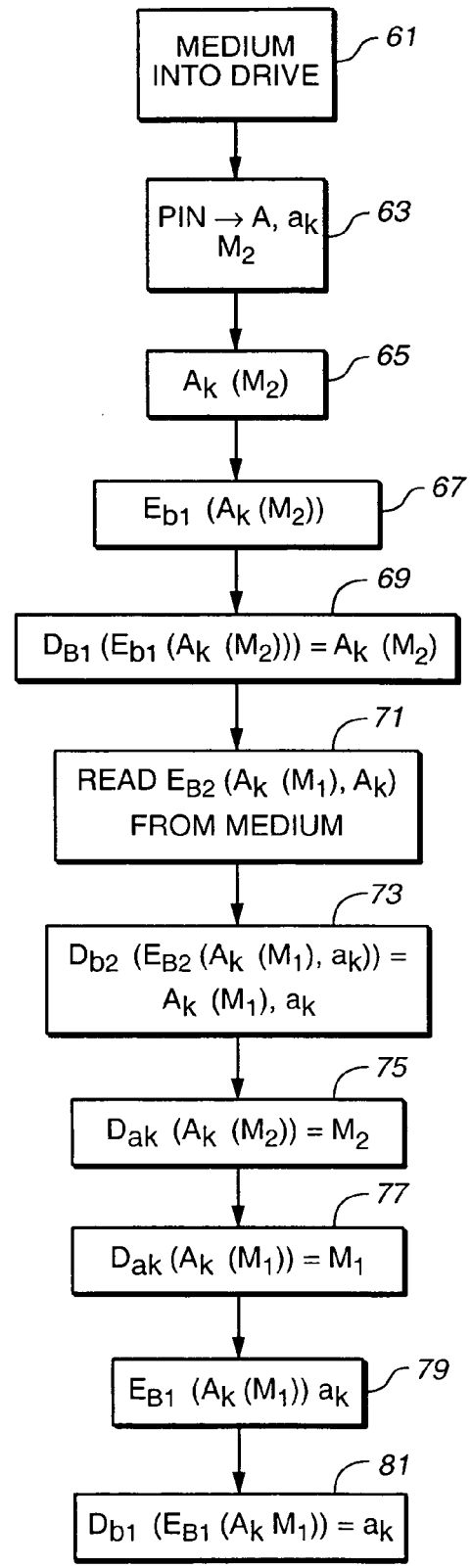
FIG._4

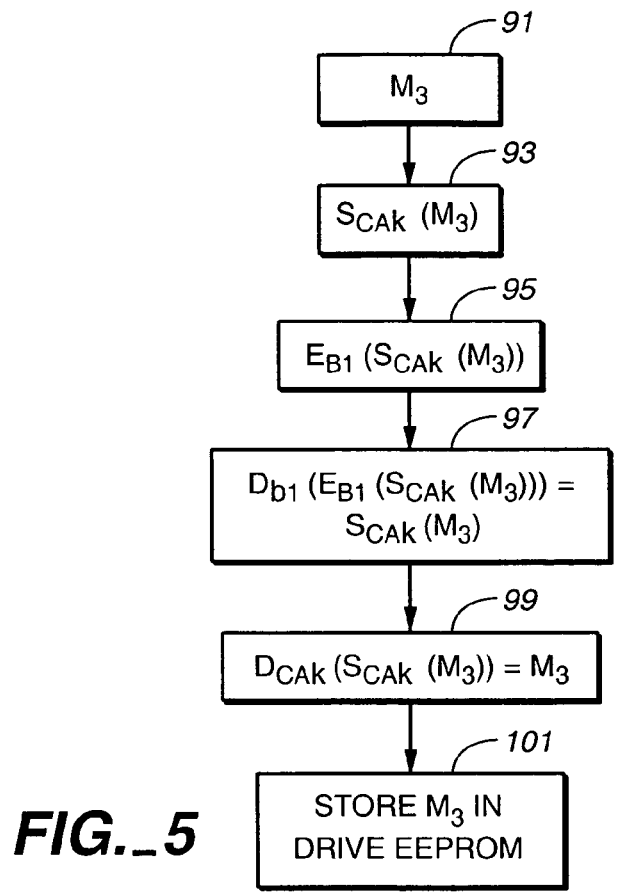
FIG._5
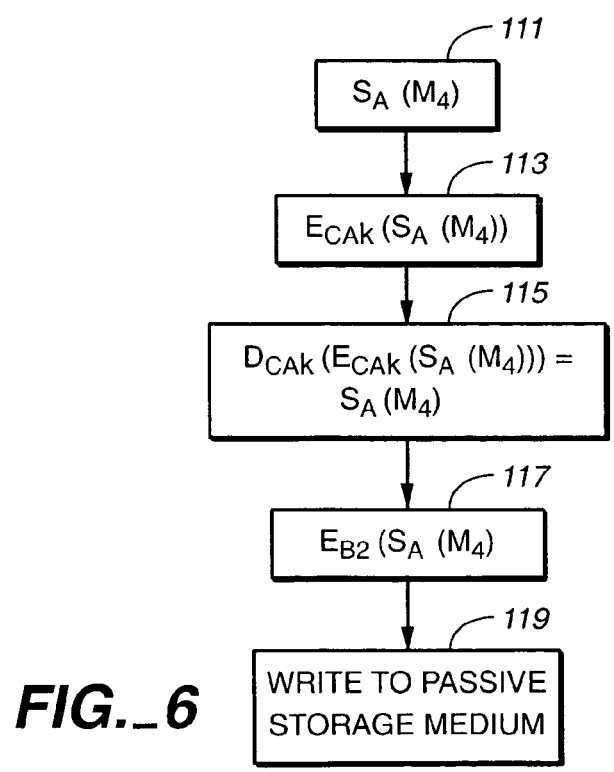
FIG._6

SECURE TRANSACTIONS WITH PASSIVE STORAGE MEDIA

CROSS-REFERENCE TO RELATED APPLICATION

This is a continuation of application Ser. No. 09/611,350 entitled, "Secure Transactions with Passive Storage Media" and filed Jul. 6, 2000 now U.S. Pat. No. 6,871,278.

TECHNICAL FIELD

The present invention relates to passive data storage media, such as optical memory cards, and transaction systems making use of such media, and in particular relates to measures taken to ensure secure transactions.

BACKGROUND ART

In U.S. Pat. No. 5,694,471, Chen et al. disclose a system for preventing fraudulent use of identity or transaction cards. The cards are chip cards that include an integrated circuit with a unique serial number permanently and unalterably burned into the chip, and having sufficient storage capacity for a card issuer identification (ID) number, user information (name, account number, signature image, etc.), the public key of a public-private key pair, a digital signature, and a personal identification number (PIN) derived from a user password. To initialize a card, a one-way hash function is performed on the issuer ID and user information to obtain a checksum, an XOR operation is performed on the checksum and card serial number to obtain a composite result, and this result is enciphered using the private key of the public-private key pair to obtain the digital signature. Also, the PIN is obtained by enciphering the card serial number using a user-entered password as the key. In carrying out a transaction at a processing terminal, a card is authenticated by deciphering its digital signature using its public key to recover the composite result, performing an XOR operation on the composite result and card serial number to recover the checksum, performing a one-way hash function on the issuer ID and user information to compute a checksum and comparing the recovered and computed checksums, which should match if the card is authentic. The user is authenticated by enciphering the card serial number using a user-entered password as the key to compute a PIN and then comparing it with the stored PIN on the card to determine whether they match.

In U.S. Pat. No. 5,999,626, Mullin et al. disclose a digital signature scheme for a smart card in which signature components for a transaction session are generated partly by the processing chip on the card and partly by the associated transaction terminal. In particular, a signature composed of a pair of elements is generated for a session by comb1ning another pair of elements selected from a set of prestored signing elements on the card, with the initial step in the computation being performed by the processing chip on the card and the result thereof transferred to the transaction device for the additional steps in the derivation. Thus, the identity of the signing elements prestored on the card is not revealed to the transaction terminal, but the bulk of the computation is implemented by the terminal instead of by the processing chip on the card.

These examples illustrate some of the ways in which secure transactions may be carried out when using a smart card, which has an embedded microprocessor chip in it. Thus, a smart card can encrypt and decrypt data (or share part of the computation with another device), that is saved internally in its memory.

In contrast, passive storage media, such as optical memory cards (OMCs), memory chip cards, compact disks (CD-R and CD-RW), or magnetic media, don't have a microprocessor chip. While they have large memory capacity useful for storing complete transaction records, they have not been deemed sufficiently secure for transaction applications like e-commerce. Any transaction system involving passive media will, like those involving smart cards, require card and user authentication protocols, and also will certainly need to have its stored transaction data be encrypted. Some computers already have encryption and protocol control processors inside the hardware, and some IC-chip readers already have some protocol control processors inside them. But in a system using passive storage media, software/firmware protocols and encryption of the data stored on the media will not be enough to ensure adequate security. Other system security components will be needed to prevent interception of decrypted data at any weak link in the transaction system and access to the encryption/decryption keys will need to be denied to all but authorized persons. To date, such security measures have been unavailable to systems that use passive storage media and, thus, in comparison to smart cards the passive media systems have been deemed too insecure for those transactions which are vulnerable to fraud or forgery (e.g., financial transactions.)

It is an object of the present invention to provide data security methods and systems for achieving secure transactions when using passive storage media, such as optical memory cards.

It is another object of the present invention to provide both hardware and software/firmware security measures to deny unauthorized access to cryptographic keys and to prevent interception of decrypted data streams.

DISCLOSURE OF THE INVENTION

These objects have been met by a transaction system that secures the read/write drive for the passive medium and the drive-host communications link from unauthorized access to the cryptographic keys and decrypted transaction data. The drive provides the encryption and decryption processing for the medium (since the medium lacks an embedded processor chip), and provides authentication of users presenting a passive medium for a transaction. Further, the drive's communication link with a host computer is also conducted using only encrypted data and secure protocols, so that no decrypted data stream is available for interception at any point in the system and only authorized communications will be recognized by the system. Only the host computer can extract or decrypt messages (commands and data) received from a drive.

Validation of a user is performed through digital certificates used by a trusted certificate authority. Each passive storage medium and each drive may have several unique keys and certificates, e.g. for different partitions or sections of the medium and for different operations or types of transactions to be mediated by the drive.

BRIEF DESCRIPTION OF THE DRAWINGS

FIG. 1 is a schematic plan view of a hardware architecture for a transaction system in accord with the present invention.

FIG. 2 is a tree diagram illustrating a digital certificate hierarchy issuing certificates used by the transaction system of the present invention.

FIG. 3 is a flow diagram for enrolling a user of the transaction system.

FIG. 4 is a flow diagram for verifying the identity of an enrolled user of the transaction system.

FIG. 5 is a flow diagram for changing keys used by a drive of the transaction system.

FIG. 6 is a flow diagram for storage of secure data.

BEST MODE FOR CARRYING OUT THE INVENTION

With reference to FIG. 1, a transaction system of the present invention includes a drive 10 for reading data from and writing data to a passive storage medium 12, such as an optical memory card, and a host computer 14 in data communication with the drive 10 via a communications link 36, which may be part of a network. An optical card is about the size of a credit card (e.g. 54×86 mm) on which is disposed an optically readable storage medium 16 storing data. The data can include analog data (watermarks, holograms, etc.) or digital data (barcodes, spots 17 formed in tracks, etc.) or both. These data contain information related both to transaction data (messages) and information related to the security of the messages (keys and certificates). Optical memory cards that store digital data can be read by an optical reader/writer which uses a laser diode and a photodetector plus some scanning optics, represented figuratively by the element 18 and light 20. Motors 22 move the card 12 and position it appropriately relative to the light 20. Such optical read/write devices for optical memory cards are well known. The solutions realized by the present invention are applicable not only to optical cards, but also any other passive storage medium (i.e., a medium lacking an embedded microprocessor), such as magnetic and optical disks (CD-ROM, CD-R, CD-RW), magnetic memory storage devices (computer hard drives) and microprocessor-less IC-chip cards, together with the corresponding drives that drive them.

The drive 10 further includes a microprocessor 24, some nonvolatile memory 26 (ROM, EPROM, EEPROM), some volatile memory 28 (RAM) and an I/O interface 34 (such as SCSI) through which the drive 10 is connected to the host computer 14. In a typical read/write drive for an optical memory card the microprocessor 24 sends and receives commands to and from the host computer 14. The microprocessor 24's firmware is stored in the nonvolatile memory 26. The firmware is code that allows the microprocessor to interpret the commands and to direct the modulation of the laser optics 18 to read or write appropriate information on the card 12. These drive elements 24-34 are common to both insecure passive media drives and the secure drives 10 of the present invention. The secure drives have additional security features, including a cryptographic processor 30 and sensors 32 that protect the drive 10 against intruders. The key or keys that the drive uses to encrypt or decrypt security information on the optical memory card 12 (secret keys, digital signatures, etc.), and to encrypt or decrypt transaction data (messages, commands), are stored in the drive's EEPROM or other nonvolatile memory 26. The drive 10 is made tamper-resistant by taking physical measures which are known in the art to seal the drive and thwart attempts to open the drive or otherwise gain unauthorized access to the keys and other critical information. In particular, the drive 10 is shielded from attacks that use electromagnetic radiation to peek inside the unit, e.g. with x-rays, or that monitor signal radiation emitted by drive circuitry which might otherwise leak out of the drive. The security sensors 32 detect attempts to open the unit, e.g. by cutting. If such an attack is detected, the unit 10 will erase the contents of its firmware and all critical information contained within its memory 26 or 29. It may also destroy parts of the circuitry by burning some of the components, e.g. cryptographic processor 30. A battery (not shown) keeps the sensors 32 and critical information operational in the absence of electricity and is used for data and component destruction in the event of an attack. Other physical security measures are also possible.

The cryptographic processor 30, in addition to encrypting and decrypting data written to or read from the card 12, also provides validation of authorized users by means of digital signature and certificate protocols, and further provides encrypting and decrypting of transaction data flowing between the drive 10 and the host computer 14 over signal lines 36. This scheme turns the passive storage medium 12 and drive 10 into a "virtual" smart card system, as seen by the host computer 14.

With reference to FIG. 2, digital certificates are documents issued in a standard format (e.g., ITU-T x.509) by a certifying authority (CA) attesting that a specific public key belongs to a particular individual or entity. Such certificates typically contain the authorized user's name and other identifying information, together with an associated public key, an expiration date, and the name and digital signature of the issuing certifying authority (CA). Thus, digital certificates are a form of digital signature of the certifying authority using its public key that certify public keys from forgery, false representation or alteration, allowing a receiver of a message (e.g. a transaction instruction or record) to authenticate the message's signature. There may be two or more certificates for authenticating a message, forming a hierarchical chain of certificates, in which the authenticity of one certificate is attested by another issued by a higher certifying authority. At the top of the certificate hierarchy is a top-level or "root" certifying authority (CA-0) (e.g., a government agency) whose public key is widely published so as to be independently known. The issuer of the optical memory card or like passive storage medium, for example, a bank or other financial institution, an insurance company, an HMO or other health provider, an employer, university or municipality is typically a level two or three certifying authority (CA-2 or CA-3). Thus, the root CA-0 entity vouches for high-level CA-1 entities, which in turn vouch for the card issuing CA-2 entities or for CA-2 entities that vouch for card issuing CA-3 entities. Different certifying authorities can have access to different drive operations, including the ab1lity to securely modify protocols and keys embedded in the drive. Different certifying authorities could also have access to different sections or partitions of a storage medium. The highest certifying authority CA-0 can give certifying authority to the drives. That is, the certifying authority (CA) certifies the drive, and the drive certifies other processes, including the drive-computer and drive-media communications, using its own certificates. Each drive can issue different types of certificates, depending on the function at the time. Each drive is capable of certifying the data before it is stored on the passive medium, and likewise before it is forwarded to the computer. Because the process of certification requires digital signatures, encryption and the like in accord with selected secure protocols, these capab1lities of the drive give the data stored in passive media enhanced security.

With reference to FIG. 3, optical memory cards or other passive storage media are issued by an enrollment process that establishes a user's digital signature for that medium. While a CA might issue certificates to unaffiliated individuals with proper identification, in a typical transaction system in accord with the present invention the card issuing CA would normally issue transaction cards containing such certificates only to their members. Thus, a company would issue cards to its own employees, a university to its faculty and students, an HMO to its doctors and member patients, a bank to its account holders, etc. In a first enrollment step 41, the new user produces a message $M_1$ containing personal data required by the issuer and selects a password or personal identification number (PIN). The password or PIN is used by the computer to generate cryptographic keys such as an asymmetric (private-public) key pair ($A_k$, $a_k$). The card could be issued over a less secure pathway, e.g. remotely over the Internet, by adding certain additional encryption and certification steps according to a secure protocol, such as secure sockets layer (SSL), Hands Like Protocol, developed by Netscape Communications Corp. Even more commonly, secure protocols are always used regardless of the supposed security of the communication pathway. Any protocol can be used, including the well established SSL protocol. The new user signs the message $M_1$ with a private key $A_k$, and the signed message $A_k(M_1)$ is encrypted by a host computer (step 45) with one of the drive's public keys $b_1$ and the user's public key $a_k$ is attached to obtain an envelope [$E_{b1}(A_k(M_1))$, $a_k$] that is sent to the certifying authority issuing the card. The key b1 used to form the envelope is a public key of a tamper-resistant drive associated with the issuer. Such drives store corresponding private keys (B1, etc.) which are inaccessible to the user or any unauthorized person. Private keys generated by the drive can be changed only by certain authorized parties, e.g. the card issuer or perhaps only to higher certifying authorities (CA-0 or CA-1). The certifying authority signs the envelope with its private key, $E_{CA}$ [$E_{b1}CA_k(M_1)$, $a_k$] and sends it to the drive (step 47). The issuer's drive then opens the envelope with the certifying authority's public key, $D_{ca}(E_{CA}[E_{b1}(A_k(M_1), a_k])=$ [$E_{b1}(A_k(M_1)$, $a_k$], (step 49) to extract the public key $a_k$. The drive accepts this key as valid because it has been certified. The drive then decrypts the signed message $D_{B1}(E_{b1}(A_k(M_1)))=A_k(M_1)$, using one of its private keys B1 (step 51). At this point, the user's public key $a_k$ could be used to extract the required personal information $D_{ak}(A_k(M_1))=M_1$.) The card issuer drive next encrypts (step 53) the envelope received from the user using another of its public keys b2 and writes the encrypted envelope [$E_{b2}(A_k(M_1))$, $a_K$] to a passive storage medium such as an optical memory card. The user is now enrolled for subsequent transactions involving the issuer's drives.

With reference to FIG. 4, in conducting a transaction, an enrolled user presenting a transaction card must verify his identity. The user inserts the card or other passive medium into a drive (step 61), and enters a password or PIN and a "request verification" command message $M_2$ (step 63). Again, the password or PIN is used by a cryptographic processor to derive an asymmetric (private-public) key pair $A_k$, $a_k$. If the user has entered the correct password or PIN then these keys will match those used in creating the envelope stored on the card. The command message $M_2$ is signed (step 65) with the private key $A_k$ in the derived pair to create the signed message $A_k(M_2)$.

The user then encrypts (step 67) the signed message with the transaction terminal's public key b1 and sends the encrypted message $E_{b1}(A_k(M_2))$ over a communications pathway to the transaction terminal, which then decrypts (step 69) the received message using a corresponding private key B1 to obtain the signed message, $D_{B1}(E_{b1}(A_k(M_2)))=A_k(M_2)$. Next, the transaction terminal reads (step 71) the personal information that was stored as an envelope on the card during enrollment, $E_{b2}(A_k(M_1)$, $a_k)$ As this signature is already encrypted, further encryption is not needed to transmit the information to the transaction terminal, even if the communications pathway is considered otherwise insecure. The transaction terminal or drive uses its private key B2 to decrypt (step 73) the signature and obtain the user's public key $a_k$, i.e. $D_{B2}(E_{b2}(A_k(M_1), a_k))=A_k(M_1), a_k$. This decryption will be successful only if the envelope from the storage medium is valid, such that the terminal drive has a private key B2 corresponding to the public key b2 used to create the envelope during enrollment. The transaction terminal then uses this user public key $a_k$ obtained from the card to decrypt (step 75) the signed message, $D_{ak}(A_k(M_2))=M_2$. When the public key obtained from the decrypted envelope read from the card corresponds to the private key derived from the user-entered PIN that was used to sign the message $M_2$, the decryption will be successful and the transaction terminal will be assured that the user is valid. The transaction terminal fulfills the user's request command by then decrypting (step 77) the user's original message, $M_1$, stored in the digital signature on the card, $D_{ak}(A_k(M_1))=M_1$, thereby revealing the user account information that enables a transaction to be conducted. The transaction terminal transmits this information to the host computer for validation of the transaction request by first encrypting (step 79) an envelope containing the signed message $A_k(M_1)$ and public key $a_k$ from its with one of its private keys B1. The encrypted message $E_{B1}(A_k(M_1), a_k)$ is decrypted (step 81) by the user with the corresponding public key of the transaction terminal, $D_{b1}(E_{B1}(A_k(M_1), a_k))=A_k(M_1), a_k$, which then validates the transaction request.

The encryption, digital signatures, certificates of any data by the host (computer, network, etc.) allows only a secure transmission to the drive, and vice versa when the drive encrypts and signs any data. That data is then re-encrypted with a comb1nation of original keys and unique (new) keys generated by and inside the drive before they are stored on the media. In other words, the encrypted data, digitally signed and certified, does not externally resemble the same data as it was sent by a computer to the drive. The fundamental reasons for those separate processes are (a) to prevent any monitoring of communications between computer and drive from shedding any light on what is being stored on the media, (b) to establish, by a kind of "remapping", a relationship between the drive and media that is unique and different from the relationship between the host computer and the drive, and (c) to prevent anyone trying to make an exact b1t copy of the media from knowing what data is being stored and how that data is being stored.

Occasionally, there will be a need to either add, delete or change keys inside the drive. Protocols could also be changed. The root authority CA-0 or a top-level authority CA-1 higher than the issuing authority CA-2 or CA-3 associated with the particular drive can certify the new keys. With reference to FIG. 5, a message $M_3$ containing the new keys (starting point 91 in FIG. 5) and commands directing the change or addition of keys, is signed by the certifying authority (CA), as seen in step 93, $CA_k(M_3)$. This is done using CA's private key $CA_k$. The CA creates a digital envelope (step 95), encrypting the signed message with a public key of the drive whose keys are being changed or added to and sends the envelope, $E_{B1}(CA_k(M_3))$ to that drive. The drive decrypts (step 97) the envelope, $D_{b1}(E_{B1}(CA_k(M_3)))=CA_k(M_3)$, and then decrypts (step 99) the signed message with the CA's public key $ca_k$, $D_{cak}(CA_k(M_3))=M_3$. The certified new keys are added (or replace some, or all, old keys) in the drive's secure EEPROM (step 101).

With reference to FIG. 6, if a user wants to store very sensitive information on the passive storage medium, such as transaction account information relating to the user, so that it will be accepted as valid on future reads by a drive or host computer, then it needs not only to be encrypted but also certified. The data is in the form of a message $M_4$, which is encrypted (step 111) by the user with a symmetric key $S_A$ to produce the envelope $S_A(M_4)$. A certifying authority then signs the envelope (step 113) with the certifying authority's public key, $D_{cak}(E_{CAk}[S_A(M_4)])=S_A(M_4)$, and then encrypts (step 117) the user's signed message with another of its private keys, $E_{B2}(S_A(M_4))$ and unites it (step 119) to the storage medium.

These examples of preferred digital signature protocols using digital certificates show how a passive storage medium can be used in secure transactions when used with tamper resistant drives containing cryptographic processors. Other protocols, such as SSL, could be used as well. The media store encrypted transaction data and an encrypted digital certificate containing a user encrypted digital signature. Access to drive encryption keys is restricted, while allowing drive operation by authorized persons presenting a valid storage medium with a user keyword or PIN. The digital certificate must be renewed periodically, as it contains an expiration date as part of the message or envelope. (Certificates might also be revised prior to their scheduled expiration date by using protocols involving certificate revocation lists (CRLs) listing current certificates.) Transaction data communication between the drive and a host computer is also encrypted using either public key or, preferably, secret key (symmetric) encryption so that there are no weak links in the system through which transaction or encryption key data might otherwise become open to unauthorized inspection. Hence, secure transactions with passive media are now possible.

The invention claimed is:

1. A secure transaction system comprising:
    a plurality of information carriers distributed to authorized users for secure storage of information related to carrying out of transactions by said authorized users, each information carrier having a passive data storage medium but lacking any data processing unit, said information stored on said passive data storage medium being in encrypted form and including transaction messages, cryptographic keys, and at least one digital certificate issued to an authorized user; and
    a drive for reading and writing information relating to transactions on an information carrier presented thereto by an authorized user, said drive connected via a communications link or network to a host computer, said drive having a control unit executing secure protocols for mediating communication between said host computer and drive and between said drive and information carrier, said drive also having a cryptographic processing unit providing encryption and decryption of transaction messages and digital certificates in accord with said secure protocols executed by said control unit and using cryptographic keys, including cryptographic keys stored by said drive and cryptographic keys read from said information carriers, as specified by said secure protocols.

2. The system of claim 1 wherein said cryptographic processing unit of said drive also provides, as specified by said secure protocols, encryption and decryption of information communicated with said host computer via said communications link.

3. The system of claim 1 wherein said drive includes sensors for detecting attempted intrusions into the drive, said control unit being responsive to said sensors for destroying critical cryptographic keys in the drive upon detection of any intrusion.

4. The system of claim 1 wherein said storage medium is logically partitioned and at least one different digital certificate is stored thereon for each partition.

5. The system of claim 1 wherein said secure protocols include an enrollment of an authorized user wherein personal data for said user is digitally signed, and transmitted from a host computer to said drive with at least one digital certificate, and recertified by said drive and stored on said passive storage medium.

6. The system of claim 1 wherein said secure protocols include a transaction by an authorized user wherein transaction requests and authorization information and are transmitted between said drive and said host computer and between said drive and said storage medium with at least one digital certificate.

7. The system of claim 1 wherein said secure protocols executed by said drive include at least one protocol that permits modification of said keys stored by said drive.

8. The system of claim 7 wherein said protocol permitting modification of said keys is one of said protocols mediating communications between said host computer and said drive.

9. The system of claim 7 wherein said protocol permitting modification of said keys is one of said protocols mediating communication between said drive and said information carriers.

10. The system of claim 7 wherein at least one of said secure protocols also permits modification of the secure protocols themselves.

11. The system of claim 1 wherein said data storage medium comprises an optical medium.

12. The system of claim 11 wherein said information carrier is an optical memory card.

13. The system of claim 11 wherein said information carrier is an optical disk.

14. The system of claim 1 wherein said information stored on said information carrier is in encrypted form corresponding to a decryption key stored in said drive.

15. The system of claim 14 wherein said information stored on said information carrier also includes personal data for generating keys of said authorized user.

16. The system of claim 15 wherein said personal data comprises any of a personal identification number (PIN) a password, and biometric data.

* * * * *